(No Model.)
T. B. HYDE.
BICYCLE.
No. 517,697. Patented Apr. 3, 1894.
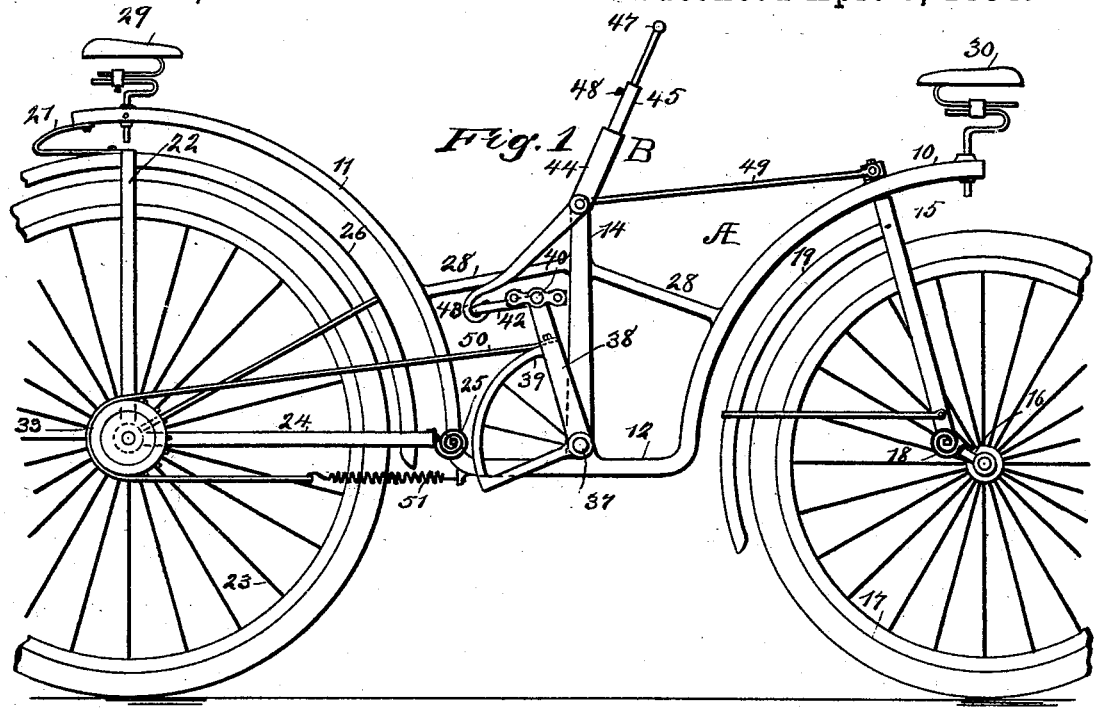
Fig. 1.
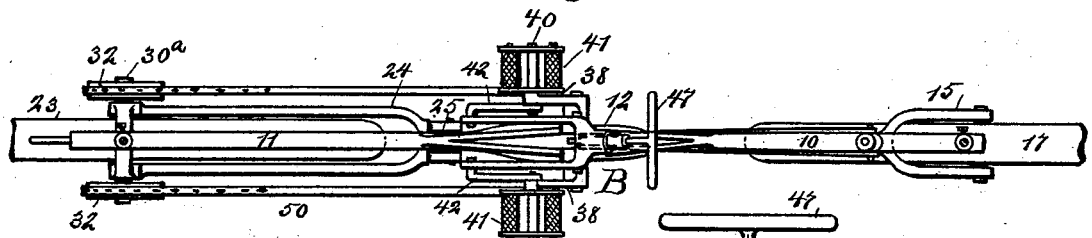
Fig. 2.
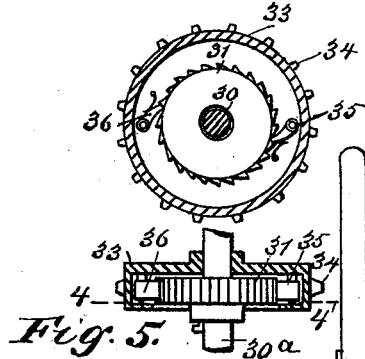
Fig. 4.
Fig. 5.
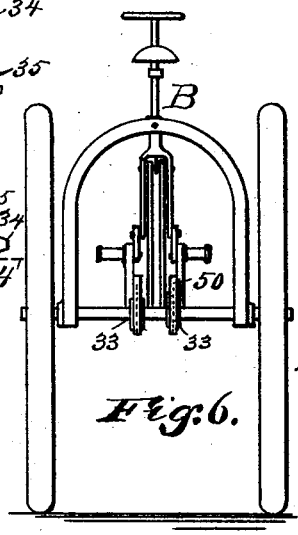
Fig. 6.
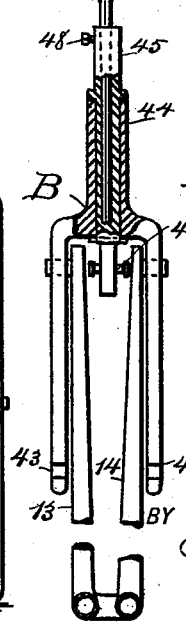
Fig. 3.
WITNESSES:
J. A. Bergstrom
C. Sedgwick
INVENTOR
T. B. Hyde
BY
Munn & Co.
ATTORNEYS.
THE NATIONAL LITHOGRAPHING COMPANY,
WASHINGTON, D. C.

UNITED STATES PATENT OFFICE.

THOMAS B. HYDE, OF TAYLOR, TEXAS.

BICYCLE.

SPECIFICATION forming part of Letters Patent No. 517,697, dated April 3, 1894.

Application filed January 31, 1893. Serial No. 460,312. (No model.)

*To all whom it may concern:*

Be it known that I, THOMAS B. HYDE, of Taylor, in the county of Williamson and State of Texas, have invented a new and useful Improvement in Bicycles, of which the following is a full, clear, and exact description.

My invention relates to an improvement in bicycles, tricycles and like machines, and has for its object to so construct the driving mechanism of the machine that it may be operated by the hands or the feet of the rider, or by both, the motion on the part of the rider in the process of propelling being similar to that of rowing.

Another object of the invention is to construct the propelling mechanism and locate the rider's seat with reference thereto in such manner that the rider must assume a position upon the machine corresponding to that assumed by an oarsman in a boat, and as the rider can work with both hands and feet all the energy and strength he is capable of exerting can be brought to bear upon the propelling mechanism in a most effective manner, and the seat can be rendered much more comfortable than at present and in no wise interfere with the rider's movements.

A further object of the invention is to provide a simple and durable steering device which will quickly and effectually respond to the rider's wishes.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of a bicycle having the improvements applied thereto. Fig. 2 is a plan view of the bicycle. Fig. 3 is a detail view of the handle bar lever and steering device. Fig. 4 is a vertical sectional view of the ratchet mechanism employed for propelling the wheel, the section being taken practically on the line 4—4 of Fig. 5. Fig. 5 is a horizontal section taken through the said ratchet mechanism; and Fig. 6 is an elevation of a tricycle having the improvement applied.

The frame A of the machine may be of any approved construction, but preferably in the bicycle the frame comprises a front arch 10 and a rear arch 11, the two arches being joined by a horizontal loop-like section 12, and from the loop-like section, at each side, standards 13 and 14, are upwardly projected, shown in detail in Fig. 3. The front arch 10 of the frame rests upon a yoke 15, and the members of the yoke are connected with bearings 16, in which the front wheel 17 revolves, by means of coil springs 18, whereby a cushion-like connection is effected between the forward portion of the frame and the forward bearings of the machine, preventing the rider from receiving violent jars or experiencing unpleasant sensations when the front wheel travels over an obstruction or very rough ground. A forward fender 19, is attached to the yoke 15, as is best shown in Fig. 1. The rear arch 11 of the frame is connected at its upper end by a spring 21, preferably of the strap pattern, with the upper portion of a yoke 22, in which the rear wheel 23, is journaled; and the yoke 22, which is vertical, is provided with a forwardly-extending and horizontally-located branch yoke 24, the loop-like connection of the frame being made with the branch yoke by a hinge or hinge bolt and spiral springs 25. Thus it will be observed that the frame is cushioned throughout its entire structure upon the bearings in which the wheels turn, enabling a rider to travel comfortably no matter what the character of the ground may be over which the machine is driven. A fender 26, is supported over the rear wheel by the rear yoke; and the arches 10 and 11, are connected with the uprights 13 and 14 by means of braces 28.

The rider's seat 29, is located preferably over the rear wheel, facing the forward one; and if in practice it is found desirable a second seat 30, may be placed over the forward wheel, and in that event the forward wheel is made smaller than the rear one, and the forward arch lower than the rear arch, to enable the person riding upon the rear seat to see over the head of the one riding upon the forward seat, as the rear rider is the one adapted especially to propel the machine.

The propelling mechanism is constructed as follows: Upon each end of the rear axle 30$^a$ a ratchet wheel 31 is firmly secured, and each ratchet wheel is surrounded and practically inclosed by an inwardly chambered wheel 33, the said wheel being preferably provided with peripheral teeth 34, to receive a chain or belt corresponding in structure to a chain. The wheels 33, which may be termed sprocket wheels, are loosely mounted upon the rear axle, as shown in Fig. 5, and in the interior of each of the sprocket wheels is carried a pivotally connected detent 35 and a pivotally connected dog 36, both of them being spring-controlled; and both the dogs and the detents are held by the springs in constant engagement with the ratchet wheels 31. Thus, in operation, when the sprocket wheels 33 are revolved in one direction, they will impart rotary motion to the ratchet wheels 31, and they being fast to the axle upon which the rear wheel is secured, will turn that wheel; but when the sprocket wheels are revolved in an opposite direction they turn loosely upon the axle and have no effect upon the wheel. A shaft 37, is journaled in the frame at the lower central portion thereof, preferably in the lower ends of the standards 13 and 14. An arm 38, is secured upon each end of the shaft 37, and each arm carries a quadrant 39, the quadrants facing the rear of the machine, and the quadrants may be either attached to the shaft and to the arms, or they may constitute, as illustrated, integral portions of the arms. The arms extend upward above the quadrants, and each arm is provided with a crank extension 40 at its upper end, carrying the pedals 41 of the machine. Each arm 38 at its upper end is also provided with an attached link 42, and these links are adapted to be engaged by hooks 43, formed upon the ends of the members of a fork B, the said fork being pivotally attached near the junction of its members and shank to the standards 13 and 14, as shown in Fig. 3. A post 45, is held to revolve in the upper or shank portion 44 of the fork, and this post extends downward between the tines and likewise between the upper ends of the frame standards 13 and 14, as is also best shown in Fig. 3. The lower end of the post carries two studs 46, located at opposite sides; and a T-bar 47, or the equivalent thereof, is inserted in an aperture produced in the post, and is held practically integral with the post through the medium of a set screw 48. The tines of the fork are located at somewhat of an angle to the shank section, as shown in Fig. 1; and the adjustment of the handle bar 47 in the post 45, is made in order that the handle bar may be raised or lowered to suit the rider of the machine. The studs 46 upon the lower end of the post of the steering apparatus are connected, preferably by straps 49, with an extension of the forward yoke 15, so that by turning the handle bar in direction of either side of the machine the front wheel will be turned in like manner so as to direct the machine to the right or to the left. The ratchet mechanism is driven through the medium of belts 50, which are secured to the upper portions of the quadrants 39; and the said belts pass over the sprocket wheels 33, the belts being provided with openings to receive the teeth of the wheels, and the lower end of each belt has attached to it a spring 51, the springs being also secured to the lower central portions of the frame. The springs 51, are return springs, being adapted to restore the quadrants to their normal position when they have been forced out of it.

In operation the machine may be driven by both the hands and feet of the operator by simply placing the feet upon the pedals 41 and causing the hooks 43 of the fork to engage with the links 42 connected with the pedal arms. By pressing forwardly with the feet against the pedals and drawing the handle bar in the direction of the body, the quadrants will be forwardly rocked and the belts 50, will be carried forwardly at their upper ends, turning the ratchet mechanism and revolving the rear wheel of the machine; at the same time the springs 51 connected with the belts are expanded, and after the pedal arms and quadrants have been rocked forward as far as possible the springs 51 will return the quadrants in position to be again pushed forward and the handle bar in position to be pulled back.

The machine may be worked by the hands only when the fork connected with the handle bar is in engagement with the links 42; or the machine may be worked by the feet only by simply disengaging the fork from the links 42.

The propelling mechanism of the machine above described will bring into pleasant, agreeable and vigorous action all the muscles in the body of the rider, and will therefore be conducive to health, more so than the propelling mechanism ordinarily employed in bicycles and tricycles, in which the muscles of the legs only are brought into vigorous action.

In Fig. 6 I have illustrated the improvement as applied to a tricycle, and it will be observed that instead of the ratchet wheels being placed upon the outer ends of the axle of the rear wheels the ratchet mechanism is located at each side of the center of the axle.

Having thus described my invention, I claim as new and desire to secure by Letters Patent—

1. In a bicycle, a frame comprising two arches substantially concentric with the wheels, a horizontal section between the arches, uprights located essentially in the middle of the said horizontal section, braces extending from the uprights to each of the said arches, yokes connected with the bearings of the wheels and with the upper portions of the arches, and a lever pivoted to the upper ends of the uprights and connected with the said rocking pedal arms, a shaft journaled in the said uprights near their junction with the said horizontal section, arms secured to each end of the said shaft, pedals connected with the opposite ends of said arms, and a mechanism for driving one of the wheels when the said arms are rocked, substantially as described.

2. In a bicycle, the combination, with the wheels, a vertical yoke adapted to receive the axle of one wheel, a horizontal yoke extending from the axle of the same wheel, springs at the outer ends of the said yokes, and another yoke having a spring connection with the bearings of the other wheel, of a frame secured to the springs located at the outer ends of the said vertical and horizontal yokes connected with one of the wheels, and to the upper end of the yoke having a spring connection with the bearings of the other wheel, substantially as described.

3. In a bicycle, the combination, with the drive wheel and a ratchet driving mechanism located on the shaft thereof, of a pedal shaft, crank arms carried by the said shaft, driving connections between the said crank arms and the said ratchet mechanism, and a handle bar pivotally mounted in the frame of the bicycle to oscillate forward and backward in a longitudinal plane and having detachable engagement with the crank arms of the pedal shaft, as and for the purpose specified.

4. In a bicycle, the combination, with the wheels and the frame, of a fork pivoted to the frame and provided with hooks at its lower ends, links adapted to engage the hooks with one end, a drive shaft journaled in the frame, segments and bars mounted on the drive shaft, the bars having pivotal connection with the links, pedals pivoted to the upper ends of the said bars, a driving mechanism on the driving wheel, and connections between the said mechanism and the segments on the drive shaft, substantially as described.

5. In a bicycle or like machine, a ratchet mechanism located on the shaft of the driving wheel, a cranked pedal shaft having a rocking movement and a driving connection with the said ratchet mechanism, and a handle bar mounted on a transverse pivot to oscillate forward and backward in a longitudinal plane and having detachable connection with the cranks of the pedal shaft, as and for the purpose specified.

6. In a bicycle or like machine, the combination, with the driving wheel, a ratchet driving mechanism connected therewith, bars having a rocking movement in a vertical plane and adapted to operate the driving mechanism, pedals pivoted to the upper ends of the said rocking bars, a handle bar pivoted to the frame of the bicycle, links connecting the lower ends of the handle bar with the upper ends of the rocking bars, a yoke adapted for engagement with the steering wheel, a rotatable post inserted into the upper portion of the handle bar, and a connection between the post and the yoke, substantially as described.

THOMAS B. HYDE.

Witnesses:
JOS. WASENKA,
ARTHUR TUCKER.